US012406073B2

United States Patent
Kinoshita

(10) Patent No.: US 12,406,073 B2
(45) Date of Patent: Sep. 2, 2025

(54) ACCESS MANAGEMENT APPARATUS, NON-TRANSITORY COMPUTER READABLE MEDIUM, AND ACCESS MANAGEMENT METHOD

(71) Applicant: FUJIFILM Business Innovation Corp., Tokyo (JP)

(72) Inventor: Yosuke Kinoshita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 350 days.

(21) Appl. No.: 17/579,592

(22) Filed: Jan. 20, 2022

(65) Prior Publication Data

US 2023/0082547 A1    Mar. 16, 2023

(30) Foreign Application Priority Data

Sep. 13, 2021    (JP) .................................. 2021-148482

(51) Int. Cl.
G06F 21/60    (2013.01)
G06F 21/62    (2013.01)
G06Q 10/10    (2023.01)

(52) U.S. Cl.
CPC ........ G06F 21/604 (2013.01); G06F 21/6209 (2013.01); G06Q 10/103 (2013.01); G06F 2221/2141 (2013.01); G06F 2221/2147 (2013.01)

(58) Field of Classification Search
CPC .............. G06F 21/604; G06F 21/6209; G06F 2221/2141; G06F 2221/2147; G06Q 10/103
See application file for complete search history.

(56) References Cited

U.S. PATENT DOCUMENTS

| | | | |
|---|---|---|---|
| 9,774,586 B1* | 9/2017 | Roche | H04L 63/08 |
| 10,680,907 B1* | 6/2020 | Meyer | H04L 67/60 |
| 2002/0174369 A1 | 11/2002 | Miyazaki et al. | |
| 2008/0209505 A1* | 8/2008 | Ghai | G06F 21/55 726/1 |
| 2008/0209506 A1* | 8/2008 | Ghai | G06F 21/604 726/16 |
| 2011/0231900 A1* | 9/2011 | Shimoe | G06F 21/6218 726/1 |
| 2014/0123312 A1* | 5/2014 | Marcotte | G06F 21/33 726/28 |
| 2014/0129268 A1* | 5/2014 | B'Far | G06Q 10/063112 705/7.11 |

(Continued)

FOREIGN PATENT DOCUMENTS

| | | |
|---|---|---|
| JP | 2002318719 | 10/2002 |
| JP | 2008209970 | 9/2008 |

(Continued)

OTHER PUBLICATIONS

"Notice of Reasons for Refusal of Japan Counterpart Application", issued on Jun. 24, 2025, with English translation thereof, p. 1-p. 8.

*Primary Examiner* — Phy Anh T Vu

(74) *Attorney, Agent, or Firm* — JCIPRNET

(57) ABSTRACT

An access management apparatus includes: a memory storing data; and a processor configured to manage an access of a user to the data in accordance with a confidentiality score of the data and a reliability score of the user.

8 Claims, 16 Drawing Sheets

(56) References Cited

U.S. PATENT DOCUMENTS

| | | | | |
|---|---|---|---|---|
| 2015/0135305 | A1* | 5/2015 | Cabrera | G06F 21/62 |
| | | | | 726/17 |
| 2017/0353463 | A1* | 12/2017 | Wu | G06F 21/6218 |
| 2019/0012441 | A1* | 1/2019 | Tuli | G06N 3/02 |
| 2019/0312881 | A1* | 10/2019 | Dasgupta | H04L 63/104 |
| 2020/0084322 | A1 | 3/2020 | Kamiya et al. | |
| 2020/0358752 | A1* | 11/2020 | Palmer | G06F 21/6218 |
| 2020/0372161 | A1* | 11/2020 | Wu | H04L 67/306 |
| 2021/0089668 | A1 | 3/2021 | Murase | |

FOREIGN PATENT DOCUMENTS

| | | |
|---|---|---|
| JP | 2010026557 | 2/2010 |
| JP | 4719420 | 7/2011 |
| JP | 2019057040 | 4/2019 |
| JP | 2021047815 | 3/2021 |

\* cited by examiner

FIG. 2

| CONFIDENTIALITY SCORE S | GRANT CONDITIONS |
|---|---|
| 5 | GRANTED IN RESPONSE TO EXPLICIT ACTION OF FILE CREATOR |
| 4 | TWO OR MORE SPECIFIC WORDS ARE INCLUDED IN A FILE OR THE NAME OF THE FILE |
| 3 | ONE SPECIFIC WORD IS INCLUDED IN A FILE OR THE NAME OF THE FILE |
| 2 | NO SPECIFIC WORD IS INCLUDED IN A FILE OR THE NAME OF THE FILE |
| 1 | GRANTED IN RESPONSE TO EXPLICIT ACTION BY CREATOR |

| FILE | CONFIDENTIALITY SCORE S |
|---|---|
| Fa | 3 |
| Fb | 2 |
| Fc | 1 |
| Fd | 5 |
| ... | ... |

| RELIABILITY SCORE T | GRANT CONDITION |
|---|---|
| 5 | EMPLOYEE (BOARD MEMBER) |
| 4 | EMPLOYEE (MANAGER) |
| 3 | EMPLOYEE (GENERAL STAFF) |
| 2 | FREE-LANCER (WITH BUSINESS RESULTS) |
| 1 | FREE-LANCER (WITHOUT BUSINESS RESULTS) |

FIG. 5

| USER | RELIABILITY SCORE T |
|---|---|
| A1 | 3 |
| A2 | 4 |
| A3 | 2 |
| A4 | 1 |
| ... | ... |

FIG. 6

| USER | FILE | ACCESS RIGHT | GRANT PRECONDITION | OPERATION CONDITION | EFFECTIVE PERIOD | ⋮ |
|---|---|---|---|---|---|---|
| A1 | Fa | Yes | — | — | — | ⋮ |
| A1 | Fb | Yes | — | — | — | ⋮ |
| ⋮ | ⋮ | ⋮ | ⋮ | ⋮ | ⋮ | ⋮ |
| A5 | Fa | Yes | **** | ** | //~//** | ⋮ |
| A6 | Fd | No | — | — | — | — |
| A7 | Fe | Yes | **** | ** | //~//** | ⋮ |
| ⋮ | ⋮ | ⋮ | ⋮ | ⋮ | ⋮ | ⋮ |

FIG. 16

| | | | |
|---|---|---|---|
| EXAMPLE 1 | SPECIFIED START TIME AND END TIME ~90 | | |
| EXAMPLE 2 | LOG-IN TO LOG-OUT ~92 | | |
| EXAMPLE 3 | SPECIFIED WORK PERIOD ~94 | | |
| ... | ... | | |

FIG. 17

| DIFFERENCE D (D=T−S) ⎯96 | ACCESS ⎯98 | MEASURES TAKEN DURING USE OF DATA ⎯100 |
|---|---|---|
| D≥D1 | GRANTED | — |
| D1>D≥D2 | GRANTED IF SPECIAL CONDITION IS SATISFIED | APPLY MEASURE A |
| D2>D≥D3 | | APPLY MEASURE A |
| D3>D≥D4 | | APPLY MEASURES A AND B |
| D4>D | DENIED | — |

ACCESS MANAGEMENT APPARATUS, NON-TRANSITORY COMPUTER READABLE MEDIUM, AND ACCESS MANAGEMENT METHOD

CROSS-REFERENCE TO RELATED APPLICATIONS

This application is based on and claims priority under 35 USC 119 from Japanese Patent Application No. 2021-148482 filed Sep. 13, 2021.

BACKGROUND

(i) Technical Field

The present disclosure relates to an access management apparatus, a non-transitory computer readable medium, and an access management method.

(ii) Related Art

Collaborative work and outsourcing are now beginning to be in widespread use. In the collaborative work, multiple companies (or individuals or private businesses) perform a project in cooperation with each other. In the outsourcing, one company arranges for another company to do work. Ways of business involving multiple entities including the collaborative work and outsourcing hereinafter referred to as collaboration.

The collaboration of one company and a free-lancer (or outside worker) may now be considered. From the standpoint of information security, access of the free-lancer to in-house data owned by the company may be restricted. On the other hand, from the standpoint of collaboration, restriction of the access of the free-lancer to the in-house data may lead to slowing down business progress and removal or alleviation of the restriction may be performed.

Confidentiality of the in-house data to be accessed by the outside worker may be at a variety of levels. Reliability of the outside workers requesting the access to the in-house data may also be at a variety of levels. In accordance with relative relationship between the in-house data and the outside workers, the accessing to the in-house data may be adaptively and individually managed. The same is true of the case in which persons in the company access the in-house data.

Japanese Patent No. 4719420 discloses a system that grants access to data in accordance with an approval of an administrator. However, Japanese Patent No. 4719420 does not disclose a mechanism that takes into consideration a combination of data and users.

Confidentiality of data serving as an access target is various. Reliability of users (workers) requesting to access the data is also various. If the access of the users to data is uniformly granted, information security may not be guaranteed. On the other hand, if the access of the user to the data is uniformly denied, accessing that may be performed in business is not ensured. Both cases may present difficulty in keeping up or promoting the collaboration or group work.

SUMMARY

Aspects of non-limiting embodiments of the present disclosure relate to providing a mechanism that manages the access of a user to data in accordance with confidentiality of the data and reliability of the user.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an access management apparatus including: a memory storing data; and a processor configured to manage an access of a user to the data in accordance with a confidentiality score of the data and a reliability score of the user.

BRIEF DESCRIPTION OF THE DRAWINGS

Exemplary embodiment of the present disclosure will be described in detail based on the following figures, wherein:

FIG. 2 illustrates an example of a confidentiality score grant condition;

FIG. 3 illustrates an example of a confidentiality score table;

FIG. 4 illustrates an example of a reliability score grant condition;

FIG. 5 illustrates an example of a reliability score table;

FIG. 6 illustrates an example of an access right management table;

FIG. 16 illustrates an effective period of the access right; and

FIG. 17 illustrates a modification of a measure responsive to a difference.

DETAILED DESCRIPTION

Figure 1:
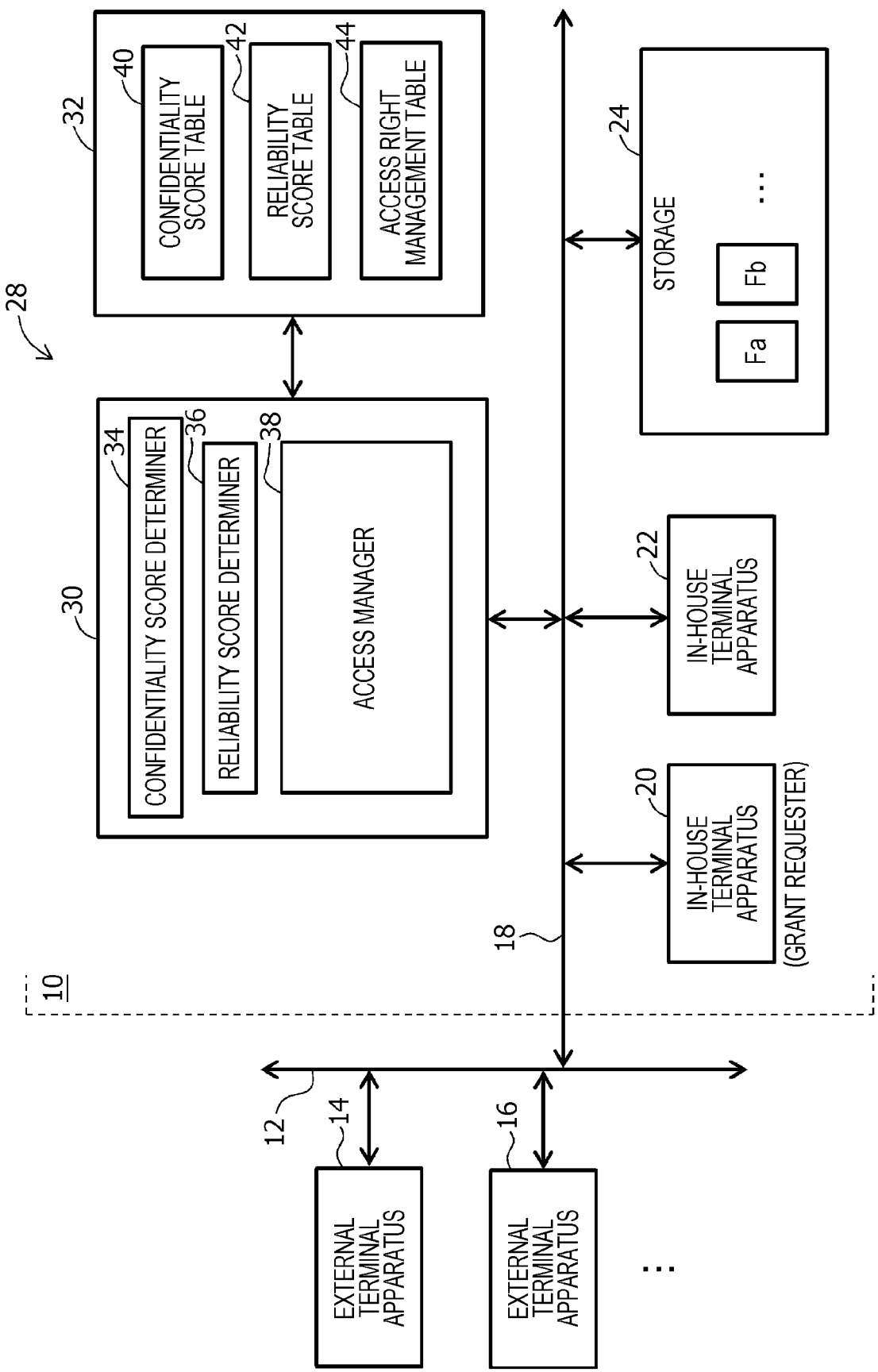
FIG. 1 is a block diagram illustrating a first configuration example of an access management apparatus.

Exemplary embodiment of the disclosure is described below.

(1) Overview of Exemplary Embodiment

An access management apparatus of an exemplary embodiment includes a memory and a processor. Data is stored on the memory. The processor manages an access of a user to the data in accordance with a confidentiality score of the data and a reliability score of the user.

The access of the user to the data may be managed in accordance with a magnitude relation of the confidentiality score of the data and the reliability score of the user.

Specifically, to grant the access to the data, a higher reliability score may be used as a confidentiality score of the data is higher, and a lower reliability score may be used as the confidentiality score of the data is lower. When an outside worker accesses in-house data in collaboration with a company and the outside worker who does not belong to the company, the configuration described above may efficiently work. Even when a user belonging to the company accesses the in-house data, the configuration may also work.

The confidentiality score of the data signifies a criterion or rank indicating how much the data is to be kept secret. The confidentiality score is thus a confidentiality level. The confidentiality score may be automatically determined in accordance with data contents, data name, and data attributes or may be specified by a score granter. The reliability score of the user signifies a criterion or rank indicating how much the user is reliable. The reliability score is thus a reliability level. The reliability score of the user may be automatically determined in accordance with an organization to which the user belongs, the position of the user in the organization, and the user's achievement, etc. or may be specified by the score granter.

According to the exemplary embodiment, the processor grants the user an access to the data if the confidentiality score and reliability score satisfy a basic condition. For example, if the reliability score is equal to or above the confidentiality score, the basic condition is satisfied. If a special condition is satisfied with the basic condition unsatisfied, the processor is configured to grant the user the access. The processor is configured to grant the user the access based on the assumption that information security is increased with the special condition satisfied. The basic condition is a principle condition that is to be satisfied to grant the access to the data. The special condition is an exceptional condition that is to be satisfied even with the basic condition unsatisfied when the access to the data is to be granted. Both information security and information accessibility may be ensured by applying the basic condition and special condition in a stepwise manner.

Several conditions may be contemplated as special conditions. For example, a first special condition is that the user and a person concerned are in the same compartment. If the person concerned is expected to monitor the user, the user may be granted the access to the data. A second special condition is that additional authentication is established with the user in addition to the establishment of the basic authentication. The establishment of double authentications signifies a lower possibility of spoofing. In view of this, the user is granted the access to the data. A third special condition is that the access of the user to the data is approved by an approver belonging to the company. By combining the automatic approval and personal approval, workload involved in approval may be reduced and the information security may be ensured.

According to the exemplary embodiment, the processor is configured to apply a monitoring measure to monitor the access of the user when the access of the user to the data is granted. For example, the processor is configured to, as the monitoring measure, generate monitoring information indicating the access of the user to the data and provide the monitoring information to the person concerned. Specifically, the processor is configured to report monitoring results. Access monitoring may increase the information security by psychologically influencing the user.

According to the exemplary embodiment, the processor is configured to calculate a difference between the confidentiality score and reliability score and modify, in accordance with the magnitude of the difference, the contents of the measure that is applied to manage the access of the user to the data. The difference between the confidentiality score and reliability score indicates a relative relationship between the confidentiality score and reliability score (also may be referred to as a magnitude relationship). If the contents of the measure managing the access in response to the relative relationship are modified, flexible access management adapted to the situation may be performed.

A program performing an access management method of the exemplary embodiment may be installed onto an information processing apparatus via a removable storage medium or via a network. The program is stored on a non-transitory computer readable medium in the information processing apparatus. The concept of the information processing apparatus includes an access management apparatus, computer, and server. The information processing apparatus may include multiple computers.

(2) Detail of Exemplary Embodiment

FIG. 1 illustrates a first configuration example of an access management apparatus 28. The access management apparatus 28 corresponds to part of an information processing system 10A arranged in a company 10. Alternatively, the access management apparatus 28 may be external to the company 10. For example, the access management apparatus 28 may be configured as a cloud server.

An information processing system 10A is connected to external terminal apparatuses 14 and 16 via a network (such as the Internet) 12. Each of the external terminal apparatuses 14 and 16 includes a computer serving an information processing apparatus and includes a processor, an input unit and a display.

In the information processing system 10A, an in-house network 18 connects to in-house terminal apparatuses 20 and 22, storage 24, and access management apparatus 28. Each of the in-house terminal apparatuses 20 and 22 is a computer serving as an information processing apparatus and includes a processor, an input unit, and a display. The storage 24 is a recording medium and serves as a file server. The storage 24 stores files Fa and Fb as in-house data. According to the exemplary embodiment, each of the files Fa and Fb is data serving as a management target and includes, for example, document data, image data, and table data. The storage 24 may include multiple recording media.

The access management apparatus 28 includes a processor 30 and a memory 32. The processor 30 includes, for example, a central processing unit (CPU) executing a program. The memory 32 is a semiconductor memory, hard disk drive, or the like. The access management apparatus 28 is an information processing apparatus. The access management apparatus 28 may include multiple computers.

Referring to FIG. 1, multiple blocks represent multiple functions performed by the processor 30. Specifically, the processor 30 functions as a confidentiality score determiner 34, reliability score determiner 36, and access manager 38. The memory 32 stores a confidentiality score table 40, reliability score table 42, and access right management table 44.

The confidentiality score determiner 34 determines a confidentiality score of each piece of data serving as an access management target. The confidentiality score corresponds to a confidentiality level. According to the exemplary embodiment, a specific confidentiality score is selected from five levels of the confidentiality scores and is granted to the data. Specifically, the five-level confidentiality score ranges from a confidentiality score 1 to a confidentiality score 5. The confidentiality score 5 is at the highest confidentiality level. A determination rule of the confidentiality scores is described below. Alternatively, the number of levels for the confidentiality scores may be four or less or six or more. According to the exemplary embodiment, the confidentiality scores determined by piece by piece of the data are registered in the confidentiality score table 40. When a file is stored on the storage 24, the confidentiality score of the file may be determined.

The reliability score determiner 36 determines the reliability score of each user serving as a target grantee of an access right. The reliability score corresponds to a reliability level. According to the exemplary embodiment, a specific reliability score is selected from five-level reliability scores and is granted to the user. Specifically, the five-level reliability score ranges from a reliability score 1 to a reliability score 5 and the reliability score 5 is at the highest reliability level. A determination rule of the reliability score is described below. Alternatively, the number of levels of the reliability score may be four or less or six or more. According to the exemplary embodiment, the reliability score determined on a per user basis is registered in the reliability score table 42. The user is typically a worker who requests the access to (or refers to, or acquires) the data.

The access manager 38 manages the access of the user to the data. Specifically, in accordance with the relative relationship or the magnitude relationship between the confidentiality score of the data and the reliability score of the user, the access manager 38 determines whether to grant the user the access right.

In the first configuration example displayed in FIG. 1, the access manager 38 grants the user the access right if the basic condition is satisfied. The basic condition is that the reliability score is equal to or above the confidentiality score to grant the access right.

In a second configuration example described below, the access manager 38 grants the access right if the basic condition or the special condition is satisfied. Specifically, if the special condition is satisfied even with the basic condition unsatisfied, the access right is granted. In such a case, the basic condition is a principal condition that is to be satisfied to grant the access right and the special condition is an exceptional condition to grant the access right. A determination as to whether the special condition is satisfied or not may be performed in the first configuration example in FIG. 1. The special condition is described in greater detail below.

The access management apparatus 28 of the exemplary embodiment may function effectively when a company and an outside worker (such as a free-lancer) not belonging to the company are in collaboration. In such a case, a person in charge in the company requests the access management apparatus 28 to grant the outside worker the access right. Referring to FIG. 1, the person in charge is referred to as a grant requester. The grant requester transmits to the access management apparatus 28 a grant request using the in-house terminal apparatus 20. In response to the reception of the grant request, the access management apparatus 28 determines a confidential rank and a reliability rank in accordance with data and a user, identified by the grant request. If the basic condition (or the special condition) is satisfied, the access management apparatus 28 issues the access right to the user. In such a case, the access right is registered as data in the access right management table 44. Data, such as an access key or the like, may also be transmitted as the access right to the user.

When a person belonging to the company accesses the in-house data, the access management apparatus 28 also functions. As described above, the company is an entity that owns the data serving as a management target (or an entity that manages the data). The concept of the company includes a variety of organizations, including a private business. Simply put, when a person belonging to an entity owning data and a person not belonging to the entity cooperate to produce, edit, or process data, a determination as to whether to grant the access right is made on a per worker (user) basis.

FIG. 2 illustrates an example of a grant rule of the confidentiality score. A rule 46 illustrated in FIG. 2 includes five grant conditions from a confidentiality score 5 to a confidentiality score 1. In accordance with the rule 46, the confidentiality score determiner 34 in FIG. 1 determines the confidentiality score.

Referring to FIG. 2, an explicit grant action of a file creator of a file grants the confidentiality score 5. The file herein is data serving as a management target and the file creator is a data creator. If two or more types of specific words are included in a file or a file name, the confidentiality score 4 is granted. If one or more types of specific words are included in the file or the file name, the confidentiality score 3 is granted. If no specific word is not included in the file or the file name, the confidentiality score 2 is granted. The explicit grant action of the file creator grants the confidentiality score 1.

Specific words may include "confidential," "secret," "secret information," and "handle with care." A word collection may be registered by an administrator. The confidentiality score may be determined in accordance with the attribute of the file, the attribute of the file creator, and the attribute of a folder storing the file. The confidentiality score may be determining by calculating an average value of or by finding a maximum value of automatically determined tentative confidentiality scores and manually specified tentative confidentiality scores.

FIG. 3 illustrates an example of the confidentiality score table illustrated in FIG. 1. Referring to FIG. 3, the confidentiality score table 40 is used to manage the confidentiality score granted on a per file basis. If a given file has been granted a confidentiality score, the confidentiality score of that file is identified by referencing the confidentiality score table 40. Alternatively, the confidentiality score may be determined again.

FIG. 4 illustrates an example of a rule 48 according to which the reliability score is granted. The rule 48 includes five grant conditions corresponding to a reliability score 5 to a reliability score 1. According to the rule 48, the reliability score determiner 36 in FIG. 1 determines the reliability score.

Referring to FIG. 4, for example, a board member of the company is granted the reliability score 5, a manager in the company is granted the reliability score 4, and a general staff is granted the reliability score 3. Referring to FIG. 4, a free-lancer as an outside worker is granted the reliability score in accordance with the presence or absence of the free-lancer's past business results. Specifically, if the free-lancer has past business results, he or she is granted the reliability score 2 and if the free-lancer does not have past business results, he or she is granted the reliability score 1.

The reliability rank may be determined in accordance with information that has been acquired from an external system (such as a personnel system or a visitor system). For example, the reliability rank may be determined in accordance with information on the attribute and position of the user. For example, the user may be granted the reliability rank in accordance with the role and position of the user in a project. For example, a person belonging to an organization in charge of a project may be granted a relatively higher reliability rank and a person belonging to an organization participating in the project may be granted a relatively lower reliability rank.

Figure 5:
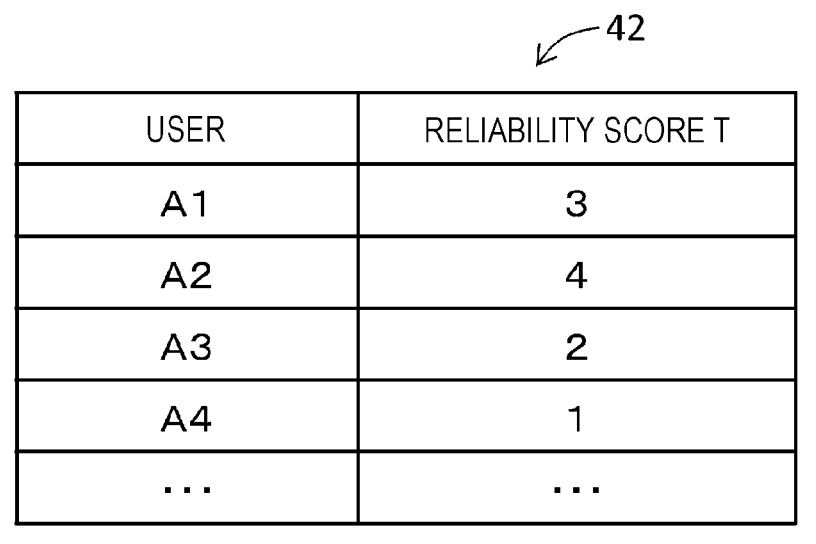

FIG. 5 illustrates an example of the reliability score table 42 in FIG. 1. The reliability score table 42 is used to manage the reliability rank granted to each user.

FIG. 6 illustrates an example of the access right management table 44 in FIG. 1. The access right management table 44 in FIG. 6 includes multiple records 49. Each record 49 corresponds to a combination of a user and a file. Specifically, each record 49 includes information 50 identifying a user, information 52 identifying a file, information 54 indicating the presence or absence of the access right, information 56 indicating a grant precondition, information 58 indicating an operation condition, and information 60 indicating an effective period. The grant precondition may be that the person is a participant of the project. Permitted operations may be restricted using the operation condition. For example, the permitted operations may be file reference or file printing and prohibited operations may be file overwriting or file deleting. The effective period is a time period throughout which the access right is effective.

Figure 7:
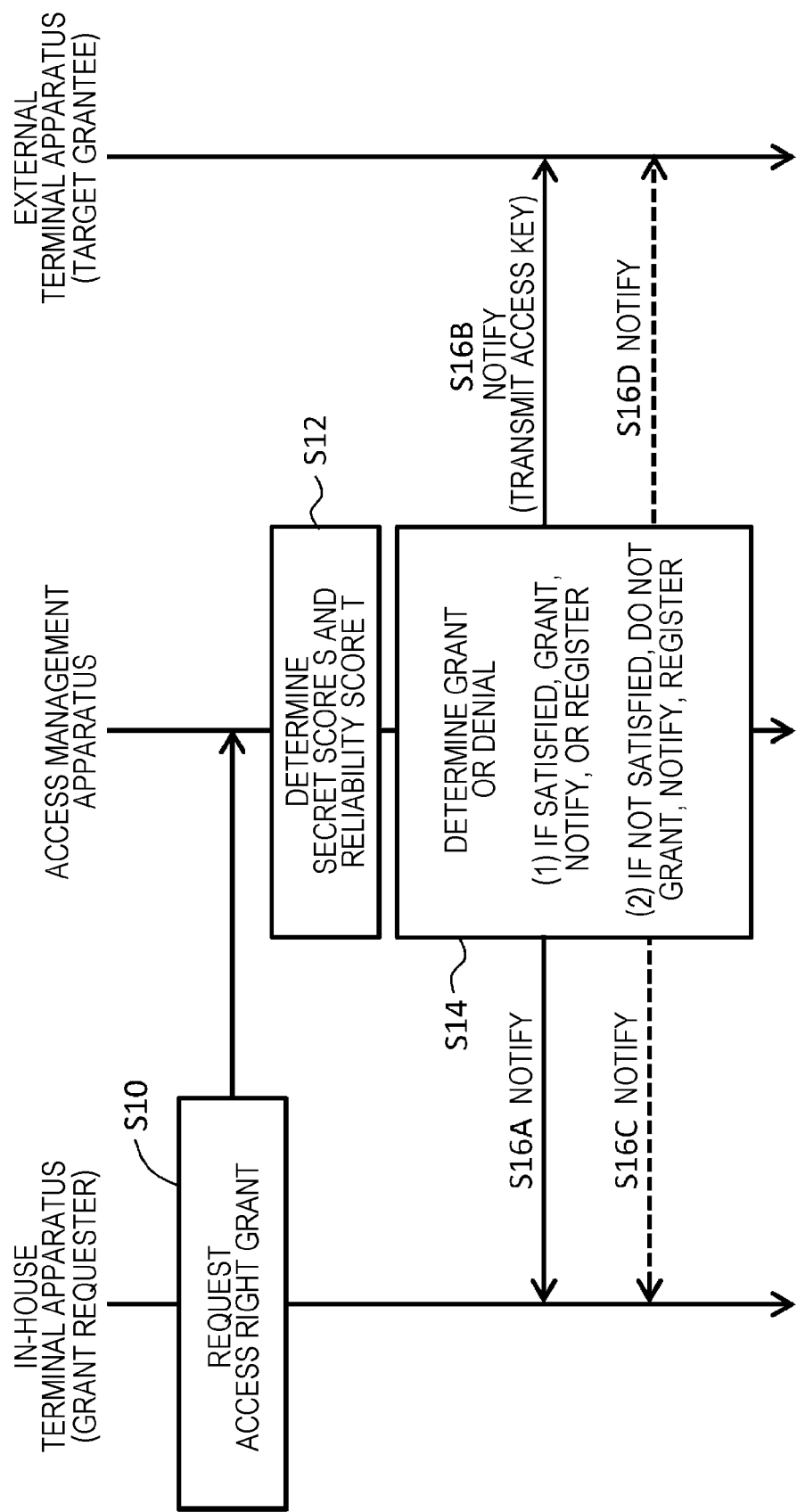
FIG. 7 is a flowchart illustrating an process example of the access management apparatus.

FIG. 7 illustrates a process example of the access management apparatus in the first configuration example. Referring to FIG. 7, a specific in-house terminal apparatus (grant requester) is illustrated at the left, an access management apparatus is illustrated at the center, and a specific external terminal apparatus (target grantee) is illustrated at the right.

In step S10, a request for an access right grant is transmitted from the in-house terminal apparatus to the access management apparatus. The request includes information identifying the data that is intended to be used by the target grantee and information identifying the target grantee. In step S12, the access management apparatus determines a confidentiality score S of the data and also determines a reliability score T of the target grantee.

In step S14, the access management apparatus determines in accordance with the confidentiality score S and the reliability score T whether to grant the access right. If the basic condition is satisfied in the first configuration example, specifically, relationship $T \geq S$ holds true, the access right is granted. In the second configuration example described below, the access right is granted if the special condition is satisfied even with the basic condition unsatisfied.

If the access right is granted, the in-house terminal apparatus is notified in step S16A that the access right has been granted and the external terminal apparatus is notified in step S16B that the access right has been granted. The access management apparatus transmits an access key to the external terminal apparatus as appropriate. If the access right is granted, the external terminal apparatus is allowed to access a specific file in a storage.

If the access right is not granted, the in-house terminal apparatus is notified in step S16C that the access right has not been granted and the external terminal apparatus is notified in step S16D that the access right has not been granted.

Figure 8:
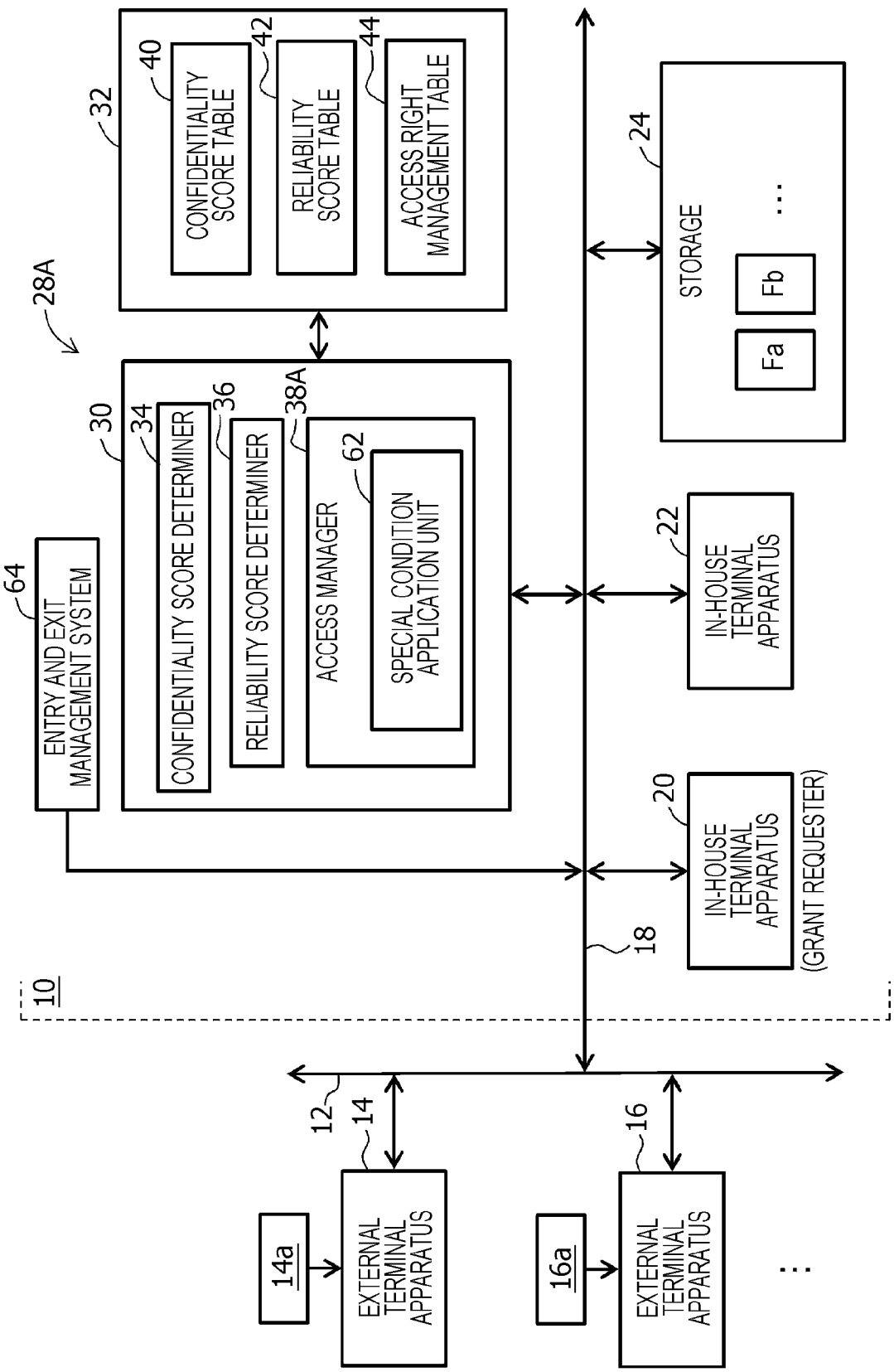
FIG. 8 is a block diagram illustrating a second configuration example of the access management apparatus.

FIG. 8 illustrates an access management apparatus 28A in the second configuration example. Referring to FIG. 8, like elements in FIG. 1 are designated with like reference numerals and the discussion thereof is not duplicated.

An access manager 38A in the access management apparatus 28A includes a special condition application unit 62. In such a case as that the confidentiality score and reliability score fail to satisfy the basic condition, the special condition application unit 62 applies the special condition to determine whether the special condition is satisfied.

When the special condition is applied, biometric authenticators 14a and 16a respectively mounted in the external terminal apparatuses 14 and 16 are used or the access management apparatus 28A operates cooperatively with an entry and exit management system 64.

Figure 9:
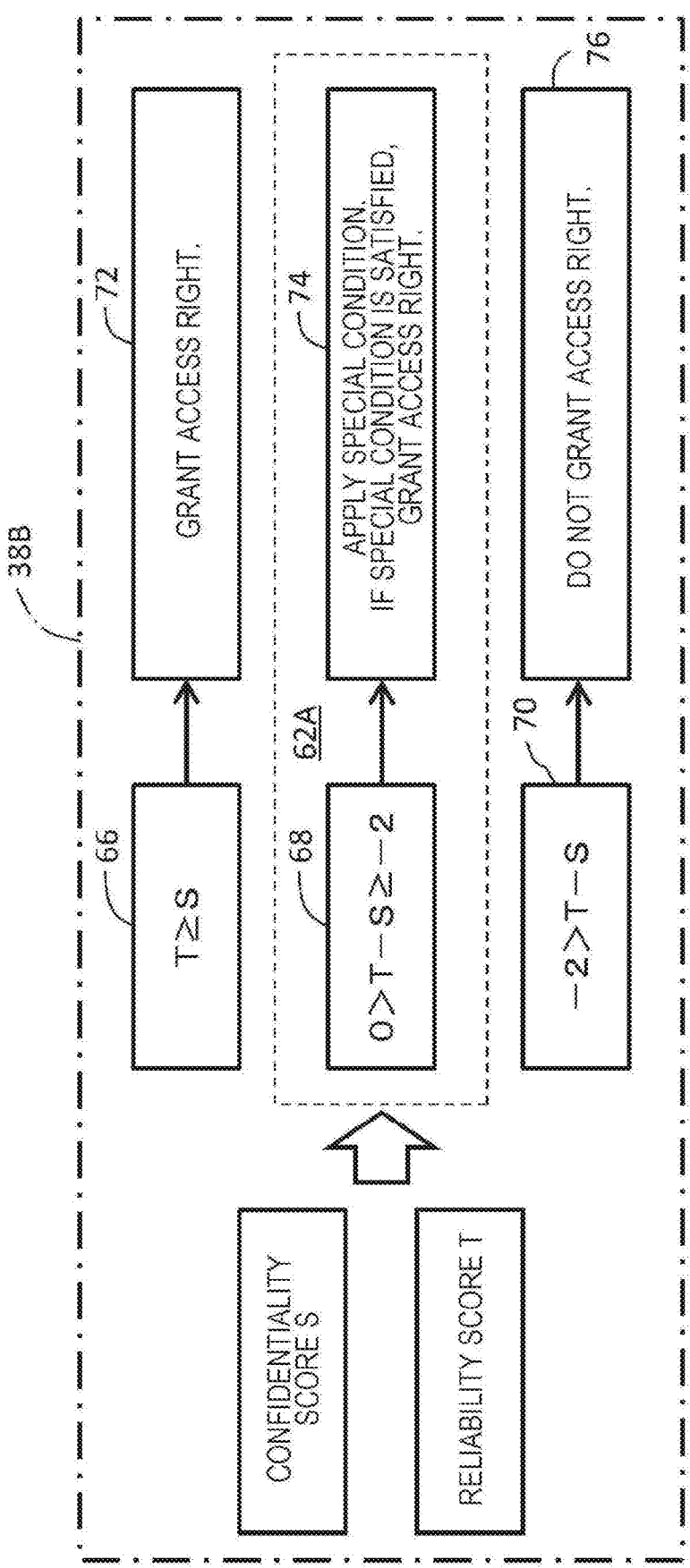
FIG. 9 is a conceptual view of an access management method.

Referring to FIG. 9, the basic condition and special condition are described. FIG. 9 illustrates an operation or process 38B performed by the access manager 38A and an operation or process 62A performed by the special condition application unit 62 in the access manager 38A.

FIG. 9 illustrates a basic condition 66. Specifically, the basic condition is "$T \geq S$." This is only an example of the basic condition. If the basic condition is satisfied, an access right is granted as illustrated by reference numeral 72. If reliability at a certain level or above is recognized on the data serving as a usage target, the access to the data is granted. If reliability at the certain level or above is not recognized, the access to the data is denied.

Reference numeral 68 denotes a precondition (application precondition) according to which the special condition is applied. If a difference (or gap) resulting from subtracting the confidentiality score S from the reliability score T falls within a range of −2 or greater and less than 0, the special condition is applied as denoted by reference numeral 74. If the special condition is satisfied, the access right is granted.

From the standpoint of information security, the access to the data may be granted as long as the basic condition is satisfied. On the other hand, from the standpoint of information accessibility, the access to the data may be granted as long as a certain level of information security is ensured even with the basic condition unsatisfied. The special condition is set up to ensure the certain level of information security. As will be described below, examples of the special condition include the satisfaction of additional authentication, the satisfaction of the same room condition, and the approval by an authorized approver.

As denoted by reference numeral 70, if neither the basic condition 66 nor the application precondition 68 is satisfied and the special condition applied is unsatisfied, the access right is not granted as denoted by reference numeral 76.

Figure 10:
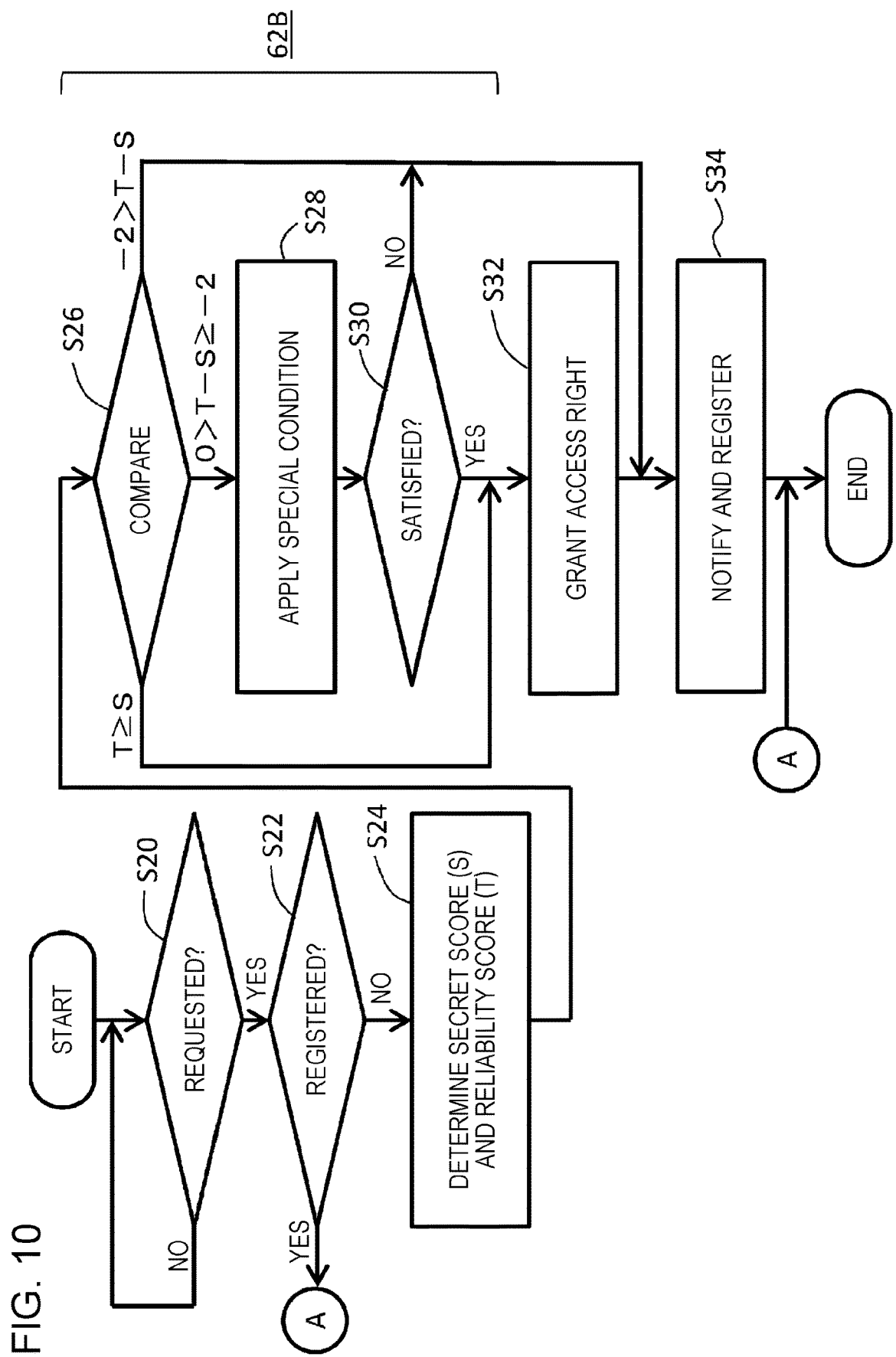
FIG. 10 is a flowchart illustrating a process example of the access management apparatus illustrated in FIG. 8.

FIG. 10 illustrates the process of the access management apparatus in the second configuration example. If the access management apparatus determines in step S20 that the access right is requested, a series of operations in step S22 and thereafter are performed. In step S22, the access management apparatus determines whether the access right for a combination of data and a user identified in response to the request of the access right grant has been registered. If the access right has not been registered, the process proceeds to step S24. If the access right has been registered, the process ends.

In step S24, the access management apparatus determines the confidentiality score S in accordance with the identified data and determines the reliability score T in accordance with the identified user. In step S26, the confidentiality score S is compared with the reliability score T. If the basic condition ($T \geq S$) is satisfied, the access right is granted in step S32. If the application precondition ($0 > T - S \geq -2$) is satisfied in step S26, the special condition is applied in step S28. If the special condition is satisfied in step S30, the access right is granted in step S32. If the access management apparatus determines in step S30 that the special condition is unsatisfied, the access right is not granted.

If neither the basic condition nor the application precondition is satisfied in step S26, specifically, if a condition (−2>T−S) is satisfied, the access right is not granted. If the access right is granted, a notification indicating that the access right has been granted is issued in step S34 and the access right is registered. If the access right is not granted, a notification indicating that the access right has not been granted is issued in step S34 and a denial of the access right is registered. FIG. 10 illustrates an operation portion 62B of the special condition application unit.

Application examples of first through third special conditions are respectively described with reference to FIGS. 11 through 13.

Figure 11:
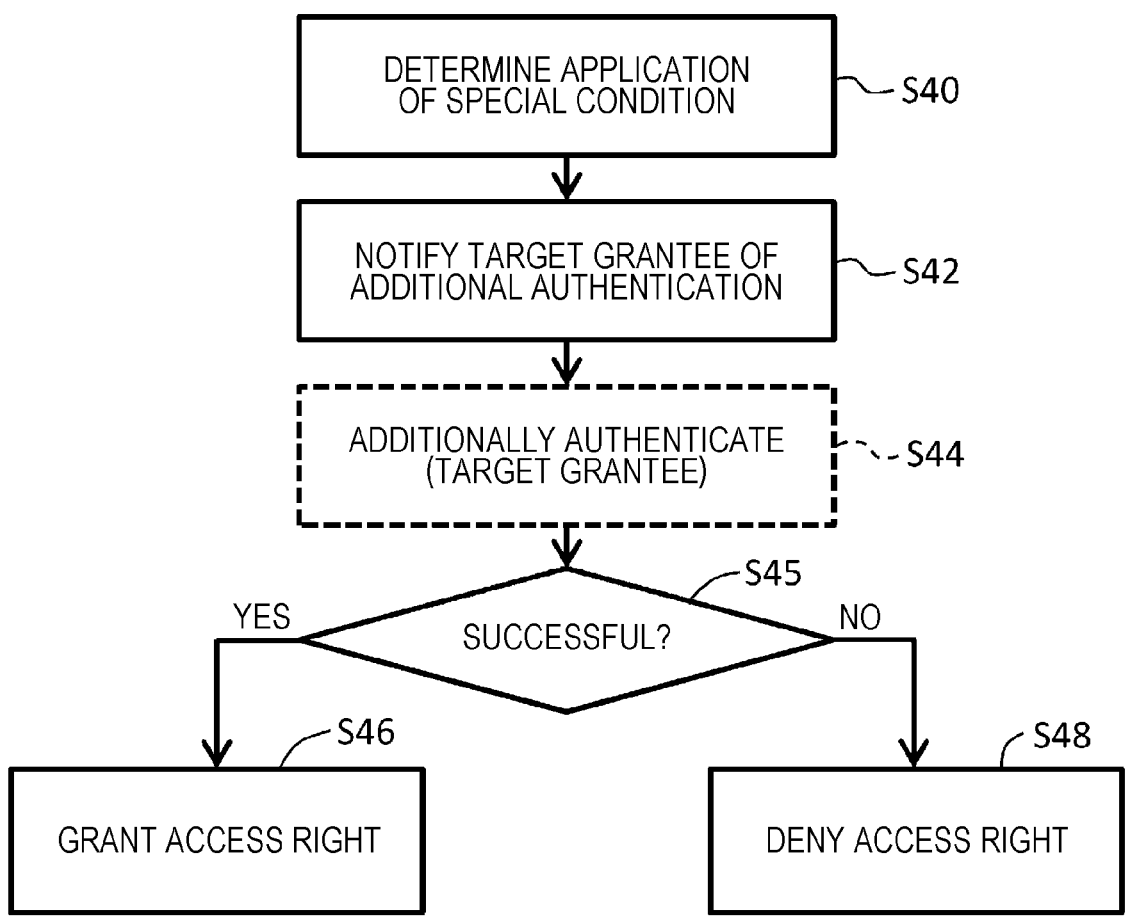
FIG. 11 is a flowchart illustrating a process when a first special condition is applied.

FIG. 11 illustrates the application example of the first special condition. The first special condition is that the target grantee is to be additionally authenticated. If the application of the special condition is determined in step S40, a notification indicating that the target grantee is to be additionally authenticated is issued to the target grantee in step S42. In step S44, the target grantee is additionally authenticated.

The additional authentication is performed in addition to basic authentication. The basic authentication is initial authentication performed at a login on the information processing system. The additional authentication is performed using biometric authentication or using a mobile phone. The biometric authentication may be, for example, fingerprint authentication. Alternatively, a one-time password may be transmitted to the mobile phone and then the user may be requested to enter the password.

In step S45, the additional authentication is determined to be successfully completed. If the additional authentication is successfully completed, the access right is granted in step S46. If the additional authentication is not successfully completed, the access management apparatus determines in step S48 that the access right is to be denied. If the double authentication is satisfied, the access right is granted because the possibility of spoofing is lower.

After the notification in step S42, the execution of the additional authentication may be requested within a specific period of time. In such a case, the length of the specific period of time may be determined in view of the situation where the target grantee has difficulty immediately responding to the notification. The notification may be put on hold before the login and may then be transmitted to the target grantee after the login.

Figure 12:
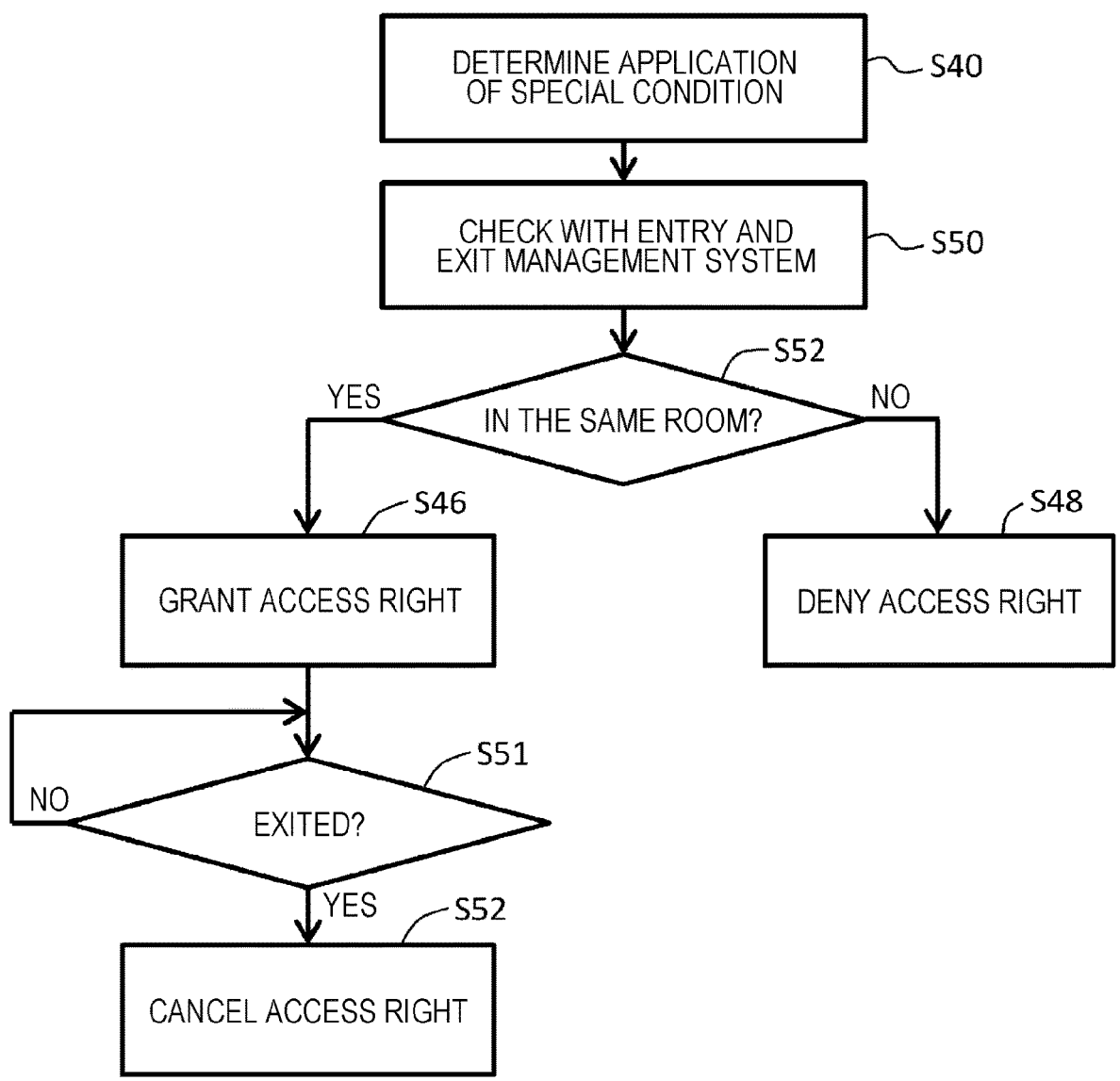
FIG. 12 is a flowchart illustrating a process when a second special condition is applied.

FIG. 12 illustrates the application example of the second special condition. Referring to FIG. 12, operations identical to the operations in FIG. 11 are designated with the same step numbers and the discussion thereof is omitted herein. The same is true of FIG. 13 described below.

The second special condition is that a target grantee (user) and a person concerned (a specific employee belonging a company, typically a grant requester) are in the same room to be granted the access right. Specifically, if the application of the special condition is determined in step S40, the access management apparatus requests in step S50, from the entry and exit management system, information that is used to determine whether the target grantee and the person concerned are in the same room. In step S52, in response to the information from the entry and exit management system, the access management apparatus determines whether the target grantee and the person concerned are in the same room.

If the target grantee and the person concerned are in the same room, the target grantee is granted the access right in step S46. If the target grantee and the person concerned are not in the same room, the access management apparatus determines in step S48 that the target grantee is to be denied the access right. After the operation in step S46, the target grantee and the person concerned are monitored about whether the target grantee and the person concerned remain in the same room. If the access management apparatus determines in step S51 that the target grantee or the person concerned has exited, the access right is cancelled in step S52. In this case, the target grantee and the person concerned may be notified of the cancellation.

If the target grantee and the person concerned are determined to be in the same room, the person concerned may be expected to monitor the target grantee. In view of this, the target grantee is granted the access right. If the person concerned may not be expected to monitor the target grantee any longer, the access right is cancelled. To determine whether the target grantee and the person concerned are in the same room, an employee identification (ID) acquired from the personnel system and a visitor ID acquired from the visitor system may be used. The access right may be granted if the target grantee and the person concerned are in the same compartment. The concept of the compartment includes a room, workshop, or the like.

Figure 13:
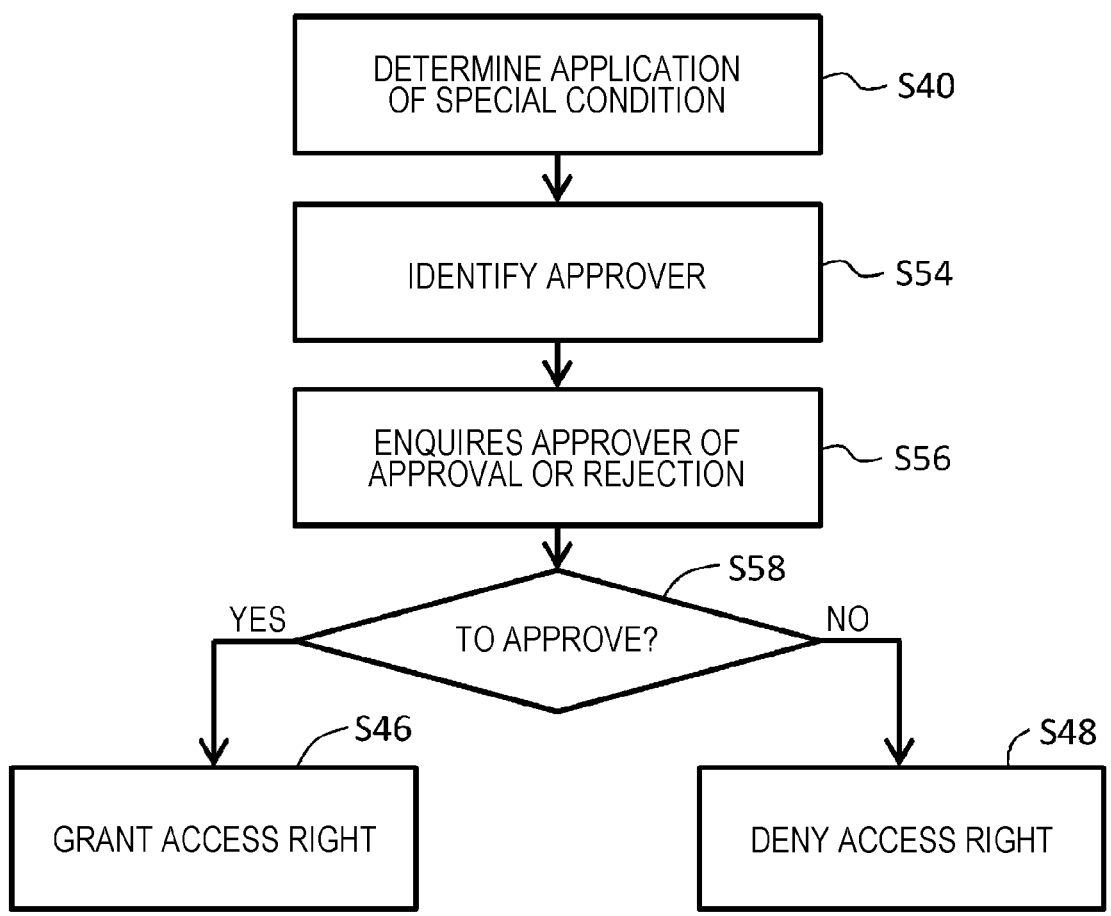
FIG. 13 is a flowchart illustrating a process when a third special condition is applied.

FIG. 13 illustrates the application example of the third special condition. The third special condition is that the user is to be approved by an approver having approval authority in the company for the user to be granted the access right.

When the application of the special condition is determined in step S40, the approver is identified in step S54. For example, the approver may be identified on a per project basis or in accordance with the post of the approver in the company. A person having logged in may be selected from among multiple persons having approval authority in the company and identified as an approver. The approver may be identified in a random fashion. The approver may typically be higher in position than the target granter in the company.

In step S56, the approver is enquired of whether to approve. If the approver has approved the target grantee in step S58, the target grantee is granted the access right in step S46. If the approver has not approved the target grantee in step S58, the access management apparatus determines in step S48 that the target grantee is not to be granted the access right.

The application of the third special condition may improve information accessibility more than when all approval is automatically performed or the application of the third special condition may reduce more workload involved in the approval than when all approval is performed personally. By applying one of the special conditions, both information security and information accessibility may be ensured at the same time. Multiple special conditions may be concurrently applied.

Figure 14:
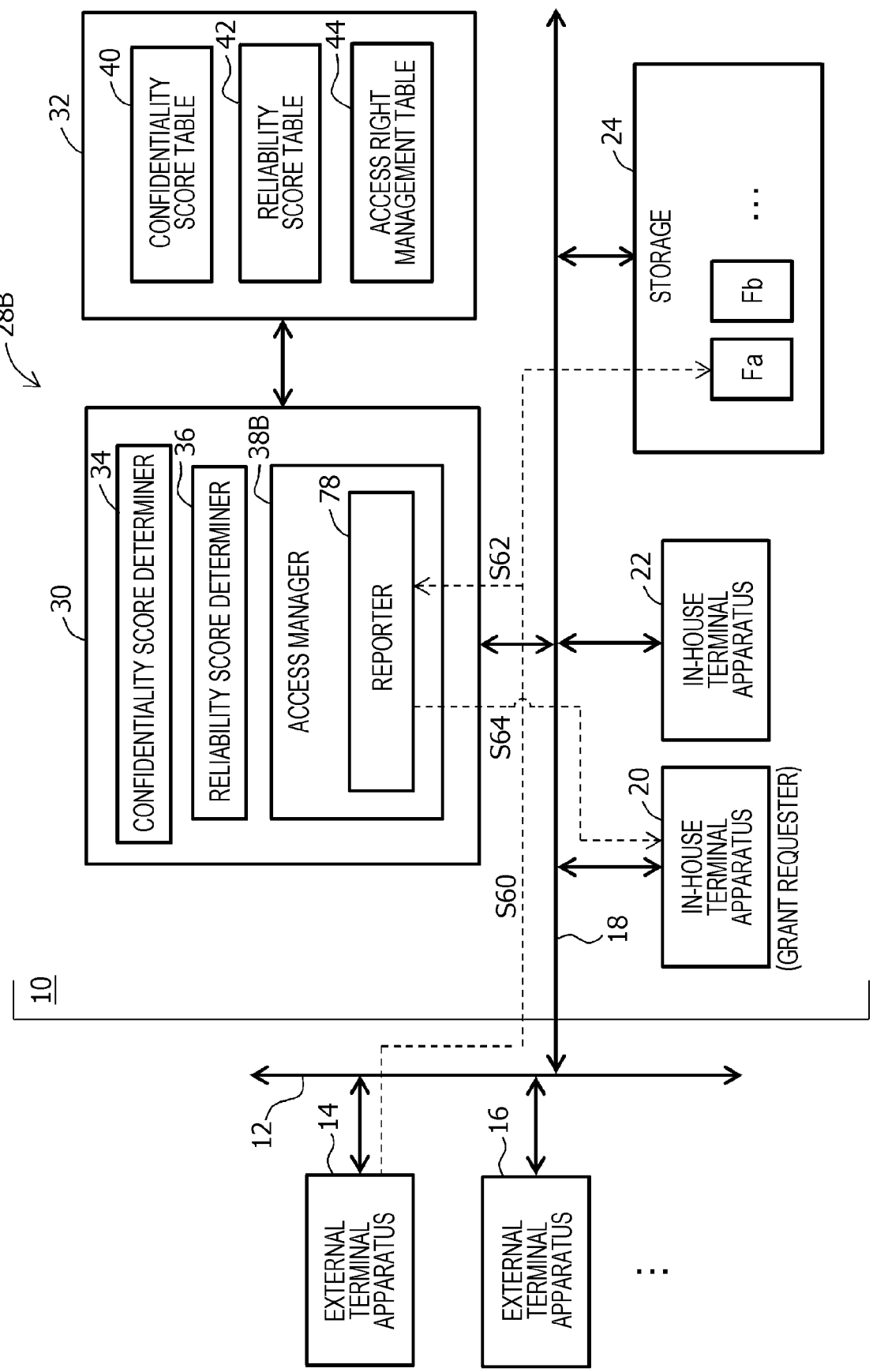
FIG. 14 is a block diagram illustrating a third configuration example of the access management apparatus.

FIG. 14 illustrates an access management apparatus 28B having a third configuration example. The access manager 38B in the access management apparatus 28B includes a reporter 78. After the access right is issued, the reporter 78 monitors a access granted in accordance with the access right, specifically, an access of a specific user to specific data, generates a report (monitoring information), and provides the report to a grant requester. The grant requester is a person who has requested the access right.

Specific process of the reporter 78 is described herein. The reporter 78 constantly monitors accessing to files Fa and Fb serving as management targets. If an outside worker (user) granted the access right accesses, using the external terminal apparatus 14, the file Fa related to the access right (see step S60), the reporter 78 recognizes the access (see step S62). Specifically, an accessor (the external terminal apparatus 14 having accessed the file Fa), the file Fa serving as an access target, and access start time are identified. The reporter 78 generates the report in accordance with these pieces of information and transmits the report to a person having requested the access right grant, namely, a user of the in-house terminal apparatus 20 (see step S64). The report is displayed on a screen of the in-house terminal apparatus 20. The file Fa being accessed by the user may be displayed on the screen.

The third configuration example improves information security in a post-grant time period by monitoring accessing after the access right is granted. The use of a combination of the first and third configuration examples or a combination of the second and third configuration examples may be acceptable.

Figure 15:
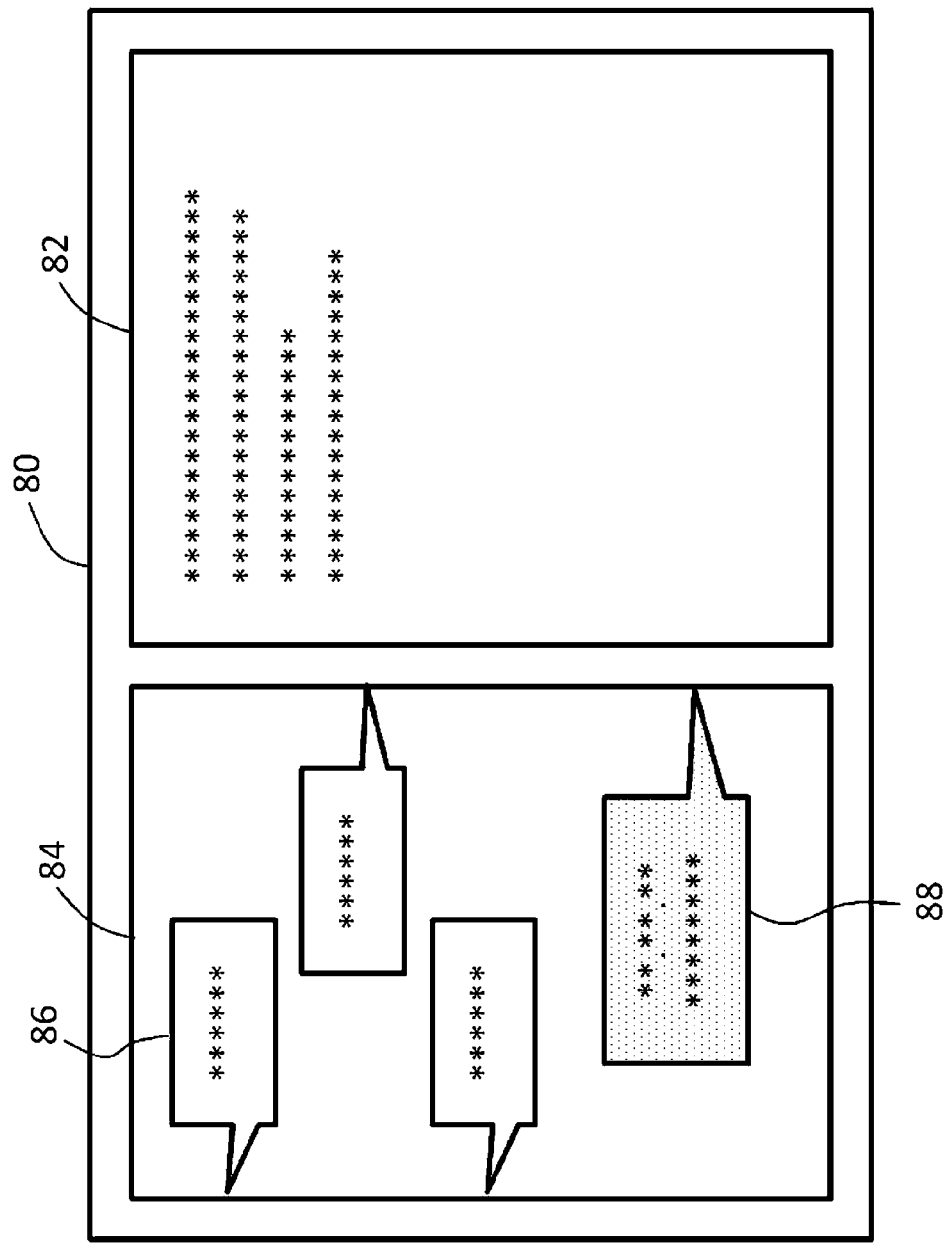
FIG. 15 illustrates a display example of monitoring information.

FIG. 15 illustrates a report display example. The report display example includes multiple display regions, namely, display regions 82 and 84 on the screen of the in-house terminal apparatus 20. The display region 84 is a message display region used to chat. The display region 84 displays multiple messages 86 arranged vertically and chronologically. A specific message 88 corresponds to a report. The report includes information indicating the date and time of an access start, information indicating an accessor, and information indicating a file serving as an access target. Not only the access start date and time but also access end date and time may be displayed on the screen. The display region 84 serves as an access log display region. The display region 82 may display a file on which the user is working. In such a case, the contents of work may be monitored. Unscrupulous action may be controlled by monitoring the accessing.

Time management of the access right is described with reference to FIG. 16. As illustrated in an example 1 in FIG. 16, an access requester may specify the start time and end time of the access right (denoted by reference numeral 90). As illustrated in an example 2, a time period from a login to a logout may be specified as the effective period of the access right (as denoted by reference numeral 92). In such a case, when the login is performed again, the access right grant request may be made again. As illustrated in an example 3, a work period may be specified as the effective period of the access right (as denoted by a reference numeral 94). The effective period of the access right may be determined according to another criterion.

FIG. 17 illustrates an example of access control performed in accordance with a difference. A difference D denoted by reference numeral 96 corresponds to results obtained by subtracting the confidentiality score S from the reliability score T in FIG. 17. Column denoted by reference numeral 98 lists whether the access is granted or not. Column denoted by reference numeral 100 lists a measure (usage restriction measure) that is applied during data usage.

For example, if relationship D1=2, D2=0, D3=−1, and D4=−2, and D≥D1 or D1>D≥D2 holds true (in this case, D is 0 or a positive integer), the basic condition is satisfied and the access is granted. Specifically, the access right is issued. However, if relationship D1>D≥D2 is satisfied, in other words, if a positive gap is smaller, a measure A is applied. For example, the measure A is access monitoring and a report is provided to the grant requester.

If relationship D2>D≥D3 or D3>D≥D4 holds true (D is a negative integer), the special condition is applied. A determination as to whether the special condition is satisfied is made. If the special condition is satisfied, the access is granted and the access right is issued. However, if the relationship D2>D≥D3 holds true, in other words, if a negative gap is smaller, the measure A is applied. If the relationship D3>D≥D4 holds true, in other words, if the negative gap is larger, the measures A and B are concurrently applied. For example, the measure B restricts the effective period of the access right to a shorter period. If relationship D4>D holds true, no access right is granted. A measure other than the measures A and B may be applied. For example, file operation contents may be modified in view of the magnitude or sign of the gap.

The condition on the access right grant may be modified depending on the magnitude of the positive gap. For example, if the positive gap is larger, the effective period may be set to be indefinite. The number of the special conditions applied may be modified depending on the magnitude of the negative gap. For example, if the negative gap is larger, the same room condition and approval condition may be used as the special conditions.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An access management apparatus for managing access to data of a company, the apparatus comprising:
   a memory storing a confidentiality score table and a rule,
      wherein the confidentiality score table records a plurality of pieces of data of the company and respective confidentiality scores, wherein the respective confidentiality scores are numeric values, and
      wherein the rule records a plurality of users and respective reliability scores, wherein the plurality users comprises users who are workers of the company and users who are not workers of the company, and the respective reliability scores are numeric values; and
   a processor configured to:
      receive a request for an access right transmitted from a first user terminal of a first user to allow a second user terminal of a second user to access first data among the plurality of pieces of data;
      determine a confidentiality score of the first data according to the confidentiality score table and determine a reliability score of the second user according to the rule;
      subtract the confidentiality score of the first data from the reliability score of the second user to determine whether to grant the access right to the second user;

in response to obtaining a difference of 0 or greater as a result of the subtracting, grant the access right to the second user, by transmitting an access key to the second user terminal, allow the second user terminal to access the first data by using the access key, and notify the first user that the access right has been granted to the second user;

in response to the reliability score of the second user being less than the confidentiality score of the first data by more than a first threshold value, reject the access right to the second user, and notify the first user that the access right has not been granted to the second user, wherein the first threshold value is a positive constant; or in response to the reliability score of the second user being less than the confidentiality score of the first data by the first threshold value or less, grant the access right to the second user if a special condition is satisfied, wherein the special condition is that the second user and the first user are in a same compartment, that the second user is not a worker of the company, and that the first user is a worker of the company and performs a job together with the second user.

2. The access management apparatus according to claim 1, wherein the first data is owned by the company.

3. The access management apparatus according to claim 1, wherein the processor is configured to apply a monitoring measure to monitor the second user terminal when the second user is granted to access the first data.

4. The access management apparatus according to claim 3, wherein the processor is configured to, as the monitoring measure, generate monitoring information indicating the access right being granted to the second user and provide the monitoring information to the first user.

5. The access management apparatus according to claim 1, wherein the processor is configured to:
calculate a difference between the confidentiality score and the reliability score; and
modify contents of a measure that manages the access right of the second user in accordance with a magnitude of the difference.

6. The access management apparatus according to claim 1, wherein the first data is a specific file stored in the memory, and wherein the processor determines a confidentiality score of the specific file and the reliability score of the second user to accordingly determine whether to allow the second user terminal to access the specific file.

7. A non-transitory computer readable medium storing a program causing a computer to execute a process causing the computer to operate as an access management apparatus for managing access to data of a company, the process comprising:
storing a confidentiality score table and a rule in a memory,
wherein the confidentiality score table records a plurality of pieces of data of the company and respective confidentiality scores, wherein the respective confidentiality scores are numeric values, and
wherein the rule records a plurality of users and respective reliability scores, wherein the plurality users comprises users who are workers of the company and users who are not workers of the company, and the respective reliability scores are numeric values;

receiving a request for an access right transmitted from a first user terminal of a first user to allow a second user terminal of a second user to access first data among the plurality of pieces of data;
determining a confidentiality score of the first data according to the confidentiality score table and determining a reliability score of the second user according to the rule;
subtracting the confidentiality score of the first data to determine whether to grant the access right to the second user;
in response to obtaining a difference of 0 or greater as a result of the subtracting, granting the access right to the second user, transmitting an access key to the second user terminal, allowing the second user terminal to access the first data by using the access key, and notifying the first user that the access right has been granted to the second user;
in response to the reliability score of the second user being less than the confidentiality score of the first data by more than a first threshold value, rejecting the access right to the second user, and notifying the first user that the access right has not been granted to the second user, wherein the first threshold value is a positive constant; or
in response to the reliability score of the second user being less than the confidentiality score of the first data by the first threshold value or less, granting the access right to the second user if a special condition is satisfied, wherein the special condition is that the second user and the first user are in a same compartment, that the second user to is not a worker of the company, and that the first user is a worker of the company and performs a job together with the second user.

8. An access management method for managing access to data of a company, the method comprising:
storing a confidentiality score table and a rule in a memory,
wherein the confidentiality score table records a plurality of pieces of data of the company and respective confidentiality scores, wherein the respective confidentiality scores are numeric values, and
wherein the rule records a plurality of users and respective reliability scores, wherein the plurality users comprises users who are workers of the company and users who are not workers of the company, and the respective reliability scores are numeric values;
receiving a request for an access right transmitted from a first user terminal of a first user to allow a second user terminal of a second user to access first data among the plurality of pieces of data;
determining a confidentiality score of the first data according to the confidentiality score table and determining a reliability score of the second user according to the rule;
subtracting the confidentiality score of the first data from the reliability score of the second user to determine whether to grant the access right to the second user;
in response to obtaining a difference of 0 or greater as a result of the subtracting, to granting the access right granted to the second user by transmitting an access key to the second user terminal, allowing the second user terminal to access the first data by using the access key, and notifying the first user that the access right has been granted to the second user;
in response to the reliability score of the second user being less than the confidentiality score of the first data by more than a first threshold value, rejecting the access right to the second user, and notifying the first user that the access right has not been granted to the second user, wherein the first threshold value is a positive constant; or in response to the reliability score of the second user being less than the confidentiality score of the first data by the first threshold value or less, granting the access right to the second user if a special condition is satisfied, wherein the special condition is that the second user and the first user are in a same compartment, that the second user is a worker of the company, and that the first user is a worker of the company and performs a job together with the second user.

* * * * *